United States Patent [19]

Mathes

[11] Patent Number: 5,234,270
[45] Date of Patent: Aug. 10, 1993

[54] AXIALLY-ALIGNING ECCENTRICALLY-ADJUSTABLE THREE-RING ANTI-FRICTION ROLLER BEARING

[75] Inventor: Josef Mathes, Offenbach/Main, Fed. Rep. of Germany

[73] Assignee: Man Roland Druckmaschinen AG, Fed. Rep. of Germany

[21] Appl. No.: 926,927

[22] Filed: Aug. 7, 1992

[30] Foreign Application Priority Data

Aug. 10, 1991 [DE] Fed. Rep. of Germany ....... 4126545

[51] Int. Cl.$^5$ .................... F16C 19/08; F16C 19/50; F16C 23/10
[52] U.S. Cl. .................................. 384/461; 384/447; 384/454
[58] Field of Search ............... 384/461, 447, 454, 455, 384/255

[56] References Cited

U.S. PATENT DOCUMENTS

| | | | |
|---|---|---|---|
| 2,986,086 | 5/1961 | Siebke et al. | 384/255 X |
| 3,605,617 | 9/1971 | Wieland | 384/255 X |
| 4,834,560 | 5/1989 | Jacob et al. | 384/461 |

FOREIGN PATENT DOCUMENTS

| | | |
|---|---|---|
| 1400319 | 10/1968 | Fed. Rep. of Germany . |
| 3324811A1 | 1/1985 | Fed. Rep. of Germany . |
| 3635569A1 | 7/1987 | Fed. Rep. of Germany . |
| 3643295A1 | 6/1988 | Fed. Rep. of Germany . |

*Primary Examiner*—Thomas R. Hannon
*Attorney, Agent, or Firm*—Leydig, Voit & Mayer

[57] ABSTRACT

The elements of an axially-aligning, eccentrically-adjustable, three-ring anti-friction roller bearing are arranged to compensate for inevitable small deformation and bore alignment errors for the journals of blanket cylinders of printing presses. Rows of rolling elements are disposed between the three bearing rings, the outer one of which has an arcuating curved swing surface. For the purposes of increasing the radial rigidity of the anti-friction mounting and for taking radial forces, the roller bearing rows include cylindrical roller bearings. In addition, there are provided, at least at one axial end, ball bearings or cross-roller axial bearings to resist axial forces. The three bearings rings are braced relative to one another axially and/or radially by a lock nut or the like threaded on the journal for urging the inner bearing ring against the bias of a spring engaging a shoulder on the journal on the other side of the bearing.

5 Claims, 1 Drawing Sheet

AXIALLY-ALIGNING ECCENTRICALLY-ADJUSTABLE THREE-RING ANTI-FRICTION ROLLER BEARING

FIELD OF THE INVENTION

The present invention relates generally to anti-friction roller bearings and more particularly concerns eccentrically adjustable, three-ring anti-friction roller bearings for the journals of a cylinder, such as a blanket cylinder of a printing press.

BACKGROUND OF THE INVENTION

Offset printing employs an arrangement of cooperating cylinders, including a plate cylinder, a blanket cylinder, and an impression cylinder, mounted for rotation in a printing press. Anti-friction roller bearings are normally provided to support the journals of these cylinders and allow ease of rotation. Typically, three-ring roller bearings, such as those shown in DE-OS 1,400,391 and DE-OS 3,643,295, having bearing rings which are disposed radially one inside the other and are held axially and/or radially relative to one another with rows of rolling bearings disposed therebetween, are employed for this purpose.

Oftentimes, it is desirable to disengage the blanket cylinder from the other cylinders. Thus, the bearings for the journals of blanket cylinders in printing machines have been designed so as to allow the blanket cylinder to be eccentrically adjusted to engage and disengage from the other cylinders. For eccentric adjustment or displacement of the cylinders, these roller bearings are provided with an eccentric intermediate ring, i.e. a ring provided with inner and outer raceways eccentric to one another, with a throw-off lever attached.

Printing presses additionally require that roller bearings be completely free from radial play and of sufficiently rigidly construction in the axial direction to prevent printing errors which may occur due to rotational deviations. A complication exists in that the weight of the cylinder tends to cause errors in the alignment of the roller bearing in the bores of the supporting press frame as a result of deflection of the cylinder and tilting of the cylinder journals. It is known in the prior art from DE-OS 3,324,811 to provide separate radial and axial bearings for anti-friction mounting of the journals of blanket cylinders in printing machines in order to increase the rigidity of the mounting. Further, to compensate for alignment errors, it is known from DE-OS 3,635,569 to form at least the outer axial contour of an outer bearing ring of a cylindrical plain bearing as an arcuate swing surface, the outer ring of the outer bearing and an inner ring of the inner bearing being eccentric so that axes of the double-eccentric plain bearings can automatically line up with the cylinder journals.

A general failing of the prior art is that it does not permit for compensation of the alignment errors of the bores in the printing press frame because the nominal bearing position is predetermined by its centering in the machine frame and its alignment to the journal is not guaranteed. Further, the prior art fails to provide a method for adequately radially prestressing these bearings to compensate for alignment errors or to provide a means for automatically aligning the bearing axis to the axis of the journal.

OBJECTS AND SUMMARY OF THE INVENTION

The primary aim of the present invention is to provide printing press blanket cylinders with axially-aligning, eccentrically-adjustable, anti-friction roller bearings which provide a high degree of radial and axial rigidity while also compensating for alignment errors and journal deflections in the bores of the supporting press frame.

In accordance with the present invention, separate radial bearings and axial bearings braceable in the axial and radial directions provide a three-ring roller bearing of high rigidity. Further, providing an outer bearing ring with a convex surface compensates for any bore alignment errors and provides for automatic bearing alignment with the journal axis.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
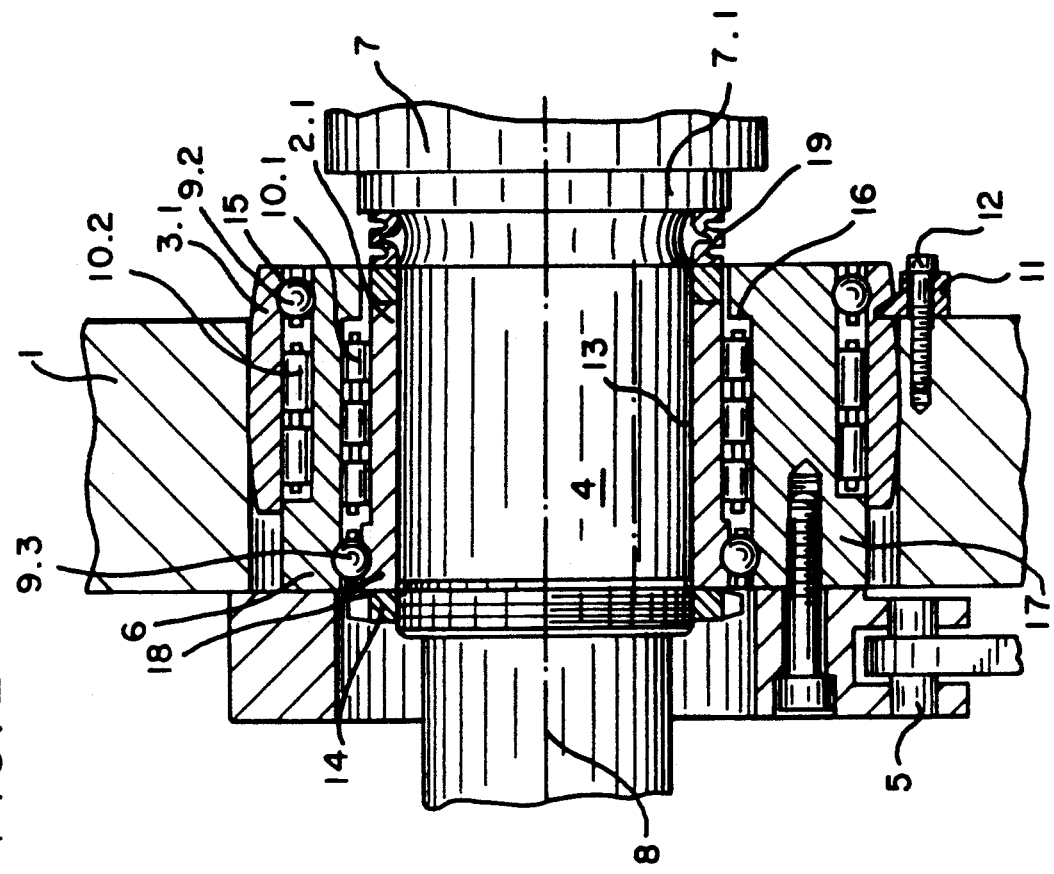
FIG. 1 is a fragmentary side view of one end of a cylinder journal showing in cross-section an axially-aligning, eccentrically-adjustable, three-ring anti-friction roller bearing of the present invention with a ball bearing for axial support.

Referring first to FIG. 1, the axially-aligning, eccentrically-adjustable, three-ring anti-friction roller bearing of the present invention includes an inner ring 2.1 connected to the journal 4 of a blanket cylinder 7 and forming part of an inner bearing 2, which has an outer raceway concentric with the journal 4. The three-ring roller bearing also includes an outer ring 3.1 disposed in a bore formed in the press frame 1. The outer ring 3.1 forms part of the outer bearing 3, which has an inner raceway concentric of the bore of the frame 1. A one-piece eccentric intermediate ring 6 is disposed between the inner bearing ring 2.1 and the outer bearing ring 3.1, and has raceways for the inner bearing 2 and outer bearing 3. The eccentric intermediate ring 6 is pivotable circumferentially by actuating means 5 such as a throw-off lever disposed outside the press frame 1. A row of cylindrical roller bearings 10.1, is provided for radial support between the eccentric intermediate ring 6 and the inner bearing ring 2.1 connected to the journal 4. Another row of cylindrical roller bearings 10.2 is provided for radial support between the outer bearing ring 3.1 and the eccentric intermediate ring 6.

An integral shoulder 15 is located on the inner radial surface of the outer axial end of outer bearing ring 3.1.

Figure 2:
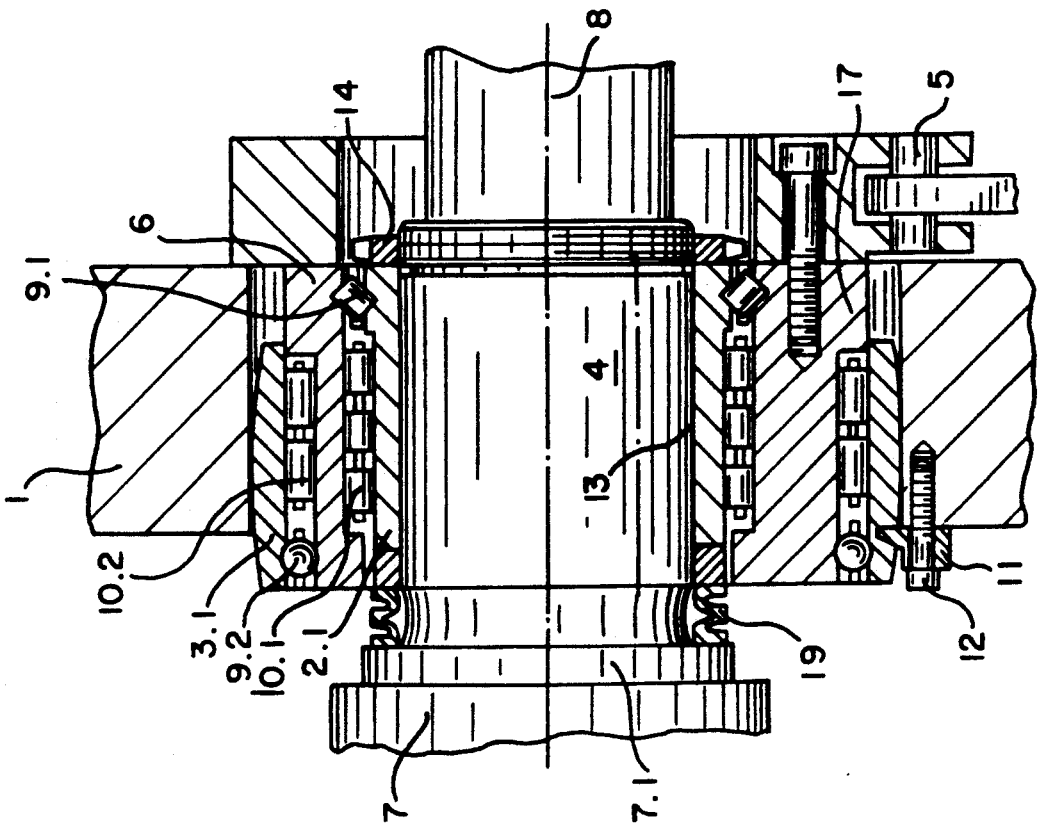
FIG. 2 is a fragmentary side view of the other end of a journal showing a cross-section of another embodiment of an axially-aligning, eccentrically-adjustable, three-ring anti-friction roller bearing of the present invention with a cross-roller axial bearing for axial support.

Intermediate bearing ring 6 is provided with an integral shoulder 17 on the outer radial surface of the inner axial end and another integral shoulder 16 on the inner radial surface of the outer axial end. An integral shoulder 18 is provided on the outer radial surface of the inner axial end of inner bearing ring 2.1. The pairs of opposed shoulders 15 and 18, 16 and 17 operate to accommodate the roller bearing rows 9, 10. Additionally, rows of axial thrust bearings 9.1, 9.2, 9.3, disposed on at least one end of each roller bearing row 9, 10 and between the bearing rings 2.1, 3.1, 6, are provided to resist axial forces. FIG. 1 shows an embodiment possessing axial thrust ball bearings 9.3 disposed between inner bearing ring 2.1 and intermediate bearing ring 6 near the inner axial end. FIG. 2 shows an embodiment possessing cross-roller axial thrust bearings 9.1 disposed between inner bearing ring 2.1 and intermediate bearing ring 6 near the inner axial end.

In accordance with the present invention, the outer bearing ring 3.1 and the eccentric intermediate ring 6 are held axially by staggered keys 11 disposed in grooves in the outer bearing ring 3.1. It will be understood that the keys are disposed perpendicular to the bearing center-line 8 and positively engage the outer bearing ring 3.1. Preferably the keys are offset circumferentially from one another for example by about 120°. As shown in the drawings the keys may be secured by screws 12 received in threaded or tapped bores in the press frame 1. The inner bearing ring 2.1, the eccentric intermediate ring 6, and the journal 4 are braced mutually and with respect to the outer bearing 3 by means of a lock nut 14 or similar means such as a locking plate and screws (not shown).

The preferred embodiment of the present invention enables the eccentric intermediate ring 6 to be pivoted through a predetermined angle without any play or friction, thus enabling the blanket cylinder to be engaged or disengaged from another cylinder. The rigidity of the three-ring roller bearing is guaranteed by the separate arrangement of radial and axial bearing rows. Slight deformation and alignment errors can be compensated for, since the bearing rings 2.1, 3.1, 6 can be braced axially and radially in conjunction with the keys 11 without any harmful force.

Pursuant to another important aspect of the present invention, the outer bearing ring 3.1 is provided with a slightly convex external surface and the keys 11 are spring biased. The convex external surface allows for rotation of the three-ring roller bearing within the bore, thus allowing automatic alignment of the three-ring roller bearing with the axis of the journal 4. In carrying out the invention, suitable springs are, for example, sets of cup springs, coil springs or the key 11 itself may be resilient. The axial tilting forces occurring in these conditions have no appreciable effect on the radially relatively rigid bearing unit.

To increase or reduce the bearing biasing, the inner bearing ring 2.1 and the journal 4 are provided with conical operative surfaces 13, in other words, the facing surfaces are tapered at on angle on the order of 50:1 The bearing ring 2.1 is movable and the bearing play adjustable by way of the lock nut 14 and the spring 19, which produces a counteracting force and which is disposed between a shoulder 7.1 on the cylinder journal and the inner bearing ring 2.1. Hydraulic pressure in conjunction with oil grooves in the bearing (not shown) may also be employed to facilitate this movement.

I claim as my invention:

1. An eccentrically-adjustable, three-ring anti-friction roller bearing for the journals of a printing press blanket cylinder, comprising in combination:
    a cylindrical inner bearing ring;
    an eccentrically-shaped intermediate bearing ring;
    a cylindrical outer bearing ring having a slightly axially convex external surface for axial alignment;
    inner rollers disposed between said inner bearing ring and said intermediate bearing ring;
    outer rollers disposed between said outer bearing ring and said intermediate bearing ring;
    throw-off means for circumferentially pivoting said intermediate bearing ring relative to said inner and outer bearing rings;
    separate roller means for resisting axial forces between said inner, outer, and intermediate bearing rings;
    a spring disposed between the inner bearing ring and a shoulder on the cylinder journal; and
    a lock nut, threaded on an externally threaded portion of the cylinder journal for adjustably urging the inner bearing ring against the biasing force of said spring.

2. A three-ring roller bearing as defined in claim 1 wherein said roller means for resisting axial forces includes cross-roller axial bearings disposed adjacent one end of said inner rollers.

3. A three-ring roller bearing as defined in claim 1 wherein said roller means for resisting axial forces includes axial thrust roller ball bearings disposed adjacent one end of said inner rollers.

4. A three-ring roller bearing as defined in claim 1 wherein said eccentric intermediate bearing ring and said outer externally slightly convex bearing ring are braced by circumferentially staggered keys disposed in grooves in the outer bearing ring, said keys being secured by screws received in tapped bores in the press frame.

5. A three-ring roller bearing as defined in claim 1 wherein said intermediate bearing ring is provided with inner and outer shoulders directed in opposition to one another, said shoulders being respectively disposed to abut one axial end of said inner and outer rollers.

* * * * *